(12) United States Patent
Soldevila et al.

(10) Patent No.: US 9,928,436 B2
(45) Date of Patent: Mar. 27, 2018

(54) LEXICON-FREE, MATCHING-BASED WORD-IMAGE RECOGNITION

(71) Applicant: CONDUENT BUSINESS SERVICES, LLC, Dallas, TX (US)

(72) Inventors: Albert Gordo Soldevila, Grenoble (FR); Jon Almazan, Grenoble (FR)

(73) Assignee: Conduent Business Services, LLC, Dallas, TX (US)

( * ) Notice: Subject to any disclaimer, the term of this patent is extended or adjusted under 35 U.S.C. 154(b) by 301 days.

(21) Appl. No.: 14/794,479

(22) Filed: Jul. 8, 2015

(65) Prior Publication Data

US 2017/0011273 A1    Jan. 12, 2017

(51) Int. Cl.
*G06K 9/18* (2006.01)
*G06K 9/00* (2006.01)

(52) U.S. Cl.
CPC ........... *G06K 9/18* (2013.01); *G06K 9/00852* (2013.01); *G06K 2209/01* (2013.01)

(58) Field of Classification Search
None
See application file for complete search history.

(56) References Cited

U.S. PATENT DOCUMENTS

| | | |
|---|---|---|
| 4,979,227 A | 12/1990 | Mittelbach et al. |
| 5,933,525 A | 8/1999 | Makhoul et al. |
| 7,917,286 B2 | 3/2011 | Taylor et al. |
| 8,472,727 B2 | 6/2013 | Gronau et al. |
| 8,503,797 B2 | 8/2013 | Turkelson et al. |
| 2005/0123200 A1 | 6/2005 | Myers et al. |

(Continued)

FOREIGN PATENT DOCUMENTS

| | | |
|---|---|---|
| EP | 0 834 138 B1 | 5/1999 |
| EP | 1 351 781 B1 | 9/2007 |

OTHER PUBLICATIONS

Application No. 16176896.5-1901, European Search Report, dated Feb. 16, 2017, 10 pages.

(Continued)

*Primary Examiner* — Sumati Lefkowitz
*Assistant Examiner* — David Perlman
(74) *Attorney, Agent, or Firm* — Gibb & Riley, LLC

(57) ABSTRACT

Methods and systems recognize alphanumeric characters in an image by computing individual representations of every character of an alphabet at every character position within a certain word transcription length. These methods and systems embed the individual representations of each alphabet character in a common vectorial subspace (using a matrix) and embed a received image of an alphanumeric word into the common vectorial subspace (using the matrix). Such methods and systems compute the utility value of the embedded alphabet characters at every one of the character positions with respect to the embedded alphanumeric character image; and compute the best transcription alphabet character of every one of the image characters based on the utility value of each embedded alphabet character at each character position. Such methods and systems then assign the best transcription alphabet character for each of the character positions to produce a recognized alphanumeric word within the received image.

20 Claims, 4 Drawing Sheets

(56) References Cited

U.S. PATENT DOCUMENTS

2014/0219563 A1* 8/2014 Rodriguez-Serrano .. G06K 9/18
382/182

OTHER PUBLICATIONS

Almazan et al., "Word Spotting and Recognition with Embedded Attributes", IEEE Transactions on Pattern Analysis and Machine Intelligence, IEEE Computer Society, USA, vol. 36, No. 12, Dec. 1, 2014, pp. 1-17.
Rodriguez-Serrano et al., "Label Embedding: A Frugal Baseline for Text Recognition", International Journal of Computer Vision, vol. 113, No. 3, Dec. 23, 2014, pp. 193-207.

* cited by examiner

LEXICON-FREE, MATCHING-BASED WORD-IMAGE RECOGNITION

BACKGROUND

Systems and methods herein generally relate to automated recognition systems and more particularly to optical character recognition (OCR) and similar systems.

Representing word images and text strings in a common space with an associated similarity metric allows a user to cast the recognition of a word image as a retrieval problem: given a word image, a system can rank all possible transcriptions (i.e., the lexicon) and use the most similar one to the image word as the predicted transcription. This is very useful if a system has advanced knowledge regarding the set of possible valid transcriptions, and this set is small. For example, a system may be interested in finding keywords related to shops in street images, or in recognizing license plates and knowing that the right transcription is in a small validated set.

Unfortunately, in other important domains, such as license plate recognition with no constraints, where the space of possible transcriptions is vastly huge, encoding and ranking all possible transcriptions is not feasible. As an illustrative example, there are $36^8 \approx 3*10^{12}$, 3 trillion possible license plates of 8 characters using only digits and the 26 characters of the Latin alphabet. Representing all these license plate transcriptions using the text features of 192 dimensions would require almost 2000 terabytes, and computing the similarities between only one image and all the license plate transcriptions would take approximately 32 hours. Therefore, a solution that exploits the benefits of describing word images with global signatures but can still perform recognition with potentially infinite lexicons is sought.

SUMMARY

Exemplary methods herein recognize alphanumeric characters in an image. Such methods compute (or precompute) individual representations of every character of an alphabet at every character position within a certain word transcription length.

Then these methods embed the individual representations of each alphabet character in a common vectorial subspace (using a matrix) to produce "embedded alphabet characters" that can be stored in a tensor. These methods also embed a received image of an alphanumeric word into the common vectorial subspace (using the matrix) to produce an "embedded alphanumeric character image." The embedded alphanumeric character image represents or implicitly encodes "image characters" at "character positions."

Such methods compute the utility value of every one of the embedded alphabet characters at every one of the character positions with respect to the embedded alphanumeric character image. The process of computing the utility value can include processing the received electronic image with a tensor to produce a utility tensor that represents the utility of transcribing each of the image characters to each of the embedded alphabet characters.

Also, these methods compute the best transcription alphabet character for each of the character positions based on the utility value of each embedded alphabet character at each character position (within the word transcription length). When computing the best transcription alphabet character, these methods find the best path over a directed acyclic graph (DAG). The DAG has nodes, where each of the nodes represents one of the embedded alphabet characters at one of the character positions, and each of the character positions includes a different node for each different embedded alphabet character. Every edge between the nodes contains the utility value and a cost value of choosing each of the nodes. Thus, the methods herein find the best path over the DAG based on the utility value and the cost value of choosing each of the nodes. This can be performed using an exhaustive search approach, where all paths are explored, or using an approximate search approach where only the most promising paths are explored.

In other words, the methods find the best path over the DAG by accumulating the utility values and the cost values of each the edges of different path in the DAG. The process of accumulating the utility value and the cost value involves calculating the score of each path of the DAG by, for each said path: summing the utility values of all edges between nodes of a given path to produce summed utility values for that path; summing the costs of all the edges of that path to produce summed cost values for the path; calculating a normal cost value of the summed cost values; and dividing the summed utility values by the normal cost value.

Then such methods assign the best transcription alphabet character for each of the character positions to produce a recognized alphanumeric word within the received image and to determine the character length of the recognized alphanumeric word.

Systems herein similarly include (among other components) an image sensor device, and an image processor device operatively connected to the image sensor device. The image processor device automatically performs initial processing by computing individual representations of all alphabet characters of an alphabet at every character position within a word transcription length, embedding the individual representations of the alphabet characters in a common vectorial subspace using a matrix to produce embedded alphabet characters, and saving the embedded alphabet characters.

After the initial processing, the image processor device repeatedly automatically performs subsequent processing without repeating the initial processing. This subsequent processing includes receiving an electronic image of an alphanumeric word from the image sensor device and embedding the electronic image into the common vectorial subspace using the matrix to produce an embedded alphanumeric character image. The embedded alphanumeric character image represents or encodes image characters at character positions.

This subsequent processing includes computing a utility value of every one of the embedded alphabet characters at each of the character positions with respect to the embedded alphanumeric character image using the image processor device, and computing the highest-utility transcription alphabet character for every one of the character positions based on the utility value of each of the embedded alphabet character at each of the character positions, within the word transcription length. During the subsequent processing, the image processor device assigns the highest-utility transcription alphabet character for each of the character positions to produce a recognized alphanumeric word within the electronic image, and determines a character length of the recognized alphanumeric word. The image processor device outputs the recognized alphanumeric word.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
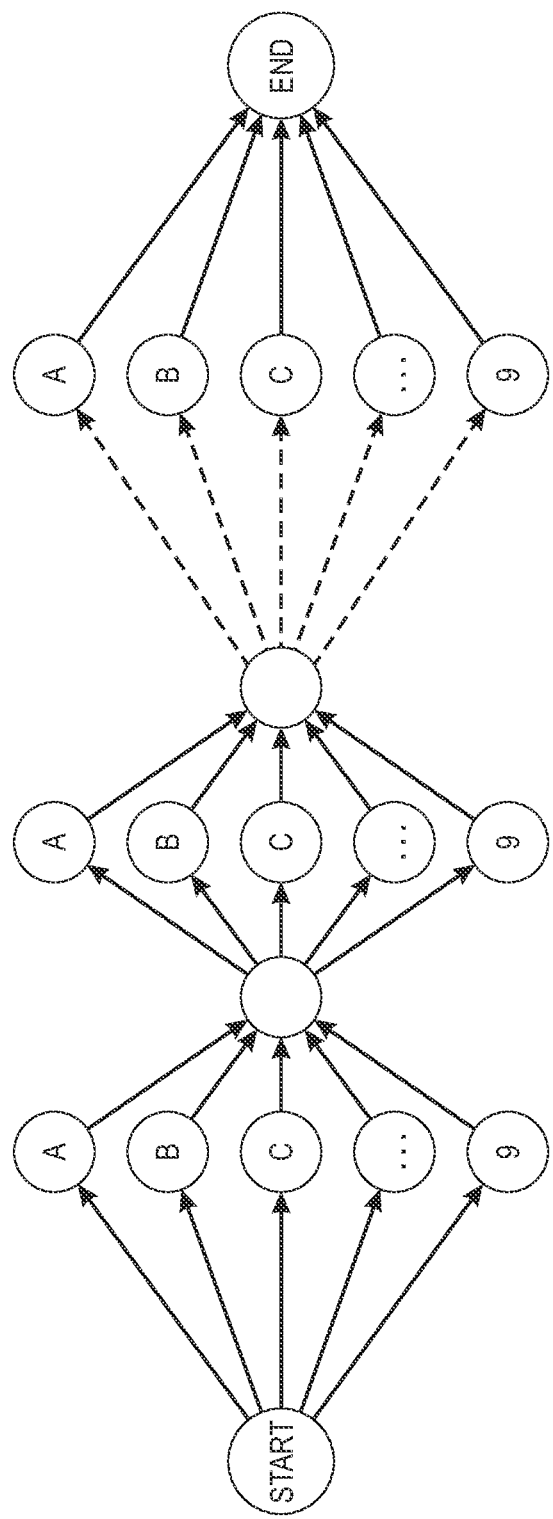
FIG. 1 is a directed acyclic graph (DAG) used by methods and devices herein.

As mentioned above, there are many global image matching frameworks which require a lexicon to perform word recognition. In general, these approaches first define two embedding functions $\phi:I \to \mathbb{R}^d$ and $\psi:S \to \mathbb{R}^d$ that embed, respectively, images and strings in a common real subspace of d dimensions. These functions are learned using labeled training data and then the similarity between an image x and a text string y is defined as the dot product between the embeddings, i.e., $$s(x,y) = \phi(x)^T \psi(y). \quad (1)$$

Given a lexicon $\gamma$, one may find the most suitable transcription of the word image $\chi$ by ranking all word in the lexicon and using the one with the largest similarity, $$\text{i.e., } \hat{y} = \underset{y \in \mathcal{Y}}{\text{argmax}}\, s(x, y) = \underset{y \in \mathcal{Y}}{\text{argmax}}\, \phi(x)^T \psi(y) \quad (2)$$

This presents problems when the size of the lexicon $\gamma$ is very large since one requires to first, offline compute the embedding of the all the strings in the lexicon and then, online give a word to transcribe perform a search through all of the lexicon. When the lexicon is large this may become unpractical and with huge lexicons (e.g. for license plate recognition), applying this directly is unfeasible. The lexicon-ranking approach also becomes problematic when the lexicon is not complete, i.e., one tries to recognize words that may not be in the lexicon: given a word and a perfectly ranked lexicon, deciding whether the top result is correct (because the lexicon contains the transcription) or incorrect (because the lexicon did not contain the transcription).

In the solutions provided by the systems and methods herein, the problem is tackled by using an optimization method instead of a ranking method. Given an image, these systems and methods determine the transcription length and the individual characters of the transcription that maximize this similarity. If one considers an alphabet $\Sigma$ that contains all possible characters that a word may contain (for example, in this case $\Sigma = \{A, \ldots, Z, 0, \ldots, 9\}$, of size $|\Sigma|=36$) then, $$\hat{y} = \underset{l,c_1,\ldots,c_l}{\text{argmax}}\, s(x, \{c_1, \ldots, c_l\}) = \underset{l,c_1,\ldots,c_l}{\text{argmax}}\, \phi(x)^T \psi(\{c_1, \ldots, c_l\}) \quad (3)$$

with $c_i \in \Sigma$. A feature herein that allows the optimization of equation is that the function $\psi$ can be decomposed to show the (non-linear) influence that each character of the word has in the final representation produced by $\psi$. In practice, the systems and methods herein show that the similarity of equation can be rewritten as the ratio of two quantities. The numerator encodes the individual utility of transcribing the i-th character of $\chi$ as $c_i$, for all characters in the word and depends on the word to recognize. The denominator encodes the cost incurred in transcribing the i-th character of the word as $c_i$, for all characters in the word and does not depend on the word to recognize, so it can be easily precomputed offline for all possible values. The numerator can be rapidly precomputed online once the word to recognize has been provided, making the evaluation of the similarity very efficient. This approach allows one to rapidly compute similarities between images and text without explicitly computing $\psi(y)$ by memorizing intermediate results. However, the search space is still dramatically large and finding the most likely transcription is still unfeasible. The systems and methods herein provide an approximate version of the search algorithm, similar to branch and bound techniques. In this example case, only the most promising parts of the search space are explored, leading to gigantic speed-ups and this can be achieved by leveraging the utility of all the individual characters. Although this approach does not guarantee the exact solution, show that the loss of accuracy because of this approximation is negligible. Therefore, the systems and methods herein provide the ability to recognize words without a lexicon using a global-image representation approach.

Furthermore the systems and methods herein also help the speed and memory efficiency. Even when the lexicon is known, for large lexicons, using the proposed similarity is more efficient than using the naive approach of equation (1) directly, which require the user to encode every single word in the lexicon and search through all of it for every new word to recognize.

The systems and methods also allow for "model introspection." By producing the most likely transcription of a word image at training time, one can note where the model is failing without being limited by the test lexicon. This highlights the fact that the underlying model is not as good as though for recognition purposes, and these lexicon-free transcriptions can potentially be used to improve the model: hard negative mining, synthesizing new training words, etc.

This disclosure starts by analyzing the $\psi$ function employed. The objective of this function is to embed text strings into a vectorial space, such as that lexicographic similarity is preserved (i.e., words that are closer using a word distance such as the Levenshtein distance should be close in the vectorial space). For this task, other global image frameworks provide a Spatial Pyramid of Characters (SPOC), that essentially computes a histogram of the characters of the word using an alphabet comprised of the 26 letters of the Latin alphabet plus 10 digits. Other methods may first provide a Pyramid Histogram of Characters (PHOC), that computes the same embedding. These representations are, however not discriminative, since words such as "listen" and "silent" would have the same embedding. To address this, the histogram is computed at multiple levels. For example, at level 2, one would produce and concatenate two separate histograms. One that encodes a histogram of the characters of the first half of the word and one that encodes a histogram of the characters of the second half of the word. Level 3 would produce 3 histograms, etc. In cases where only part of a character appears in a region (e.g., dividing a word of 3 characters in 2 regions), the character is soft-assigned to both histograms.

However, despite some subtle differences, SPOC and PHOC are essentially equivalent. In this example denoted with $h:S \to \mathbb{R}^D$ this embedding function uses a given number of levels. In the case of using levels 2 to 8, this leads to $(2+3+4+5+6+7+8)*36 = 1260$ dimensions. One interesting property is that the embedding of a text string is additive and can be decomposed into the sum of embeddings of the individual characters (preserving their position), i.e., in a slight abuse of notation, $$h(y) = \sum_{i=1}^{|y|} h(y_i, i, |y|) \qquad (4)$$

where $y_i$ is the i-th character of y and $|y|$ is the length of y. Note that the length of the word is necessary to compute h, since the relative location of a character given its absolute position depends on the length of the word (e.g., the third character of a word of length 4 is in the second half of the word, but the third character of a word of length 8 is on the first half of the word). After introducing h, the systems and methods herein can now define $\psi$ as a function of it. In other global image matching solutions, $\psi$ is simply the $l_2$ normalized h, $$\text{i.e., } \psi(y) = \frac{h(y)}{\|h(y)\|}.$$

In other global image matching solutions, h is also projected in another subspace, $$\psi(y) = \frac{W^T \frac{h(y)}{\|h(y)\|}}{\left\| W^T \frac{h(y)}{\|h(y)\|} \right\|} = \frac{W^T h(y)}{\|W^T h(y)\|}.$$

Recalling equation (1) the formula can now be rewritten as $$s(x,y) = \phi(x)^T \psi(y) = \frac{\phi(x)^T W^T h(y)}{\|W^T h(y)\|} = \frac{\sum_{i=1}^{|y|} \phi(x)^T W^T h(y_i, i, |y|)}{\left\|\sum_{i=1}^{|y|} W^T h(y_i, i, |y|)\right\|} \qquad (5)$$

Most interestingly, if the user constrains the maximum length of a word (e.g., will only recognize words of L characters or less), the systems and methods herein can easily precompute all possible values of h, project them with W, and store them in a tensor of size $$|\Sigma| \times L \times L \times d : T(i,j,l) = W^T h(\Sigma_i, j, l) \qquad (6)$$

for all i between 1 and $|\Sigma|$, all j between 1 and l, and all l between 1 and L. If the systems and methods assume a max length of L=20 characters and a dimensionality d of 192, this leads to a tensor T of 36×20×20×192, which requires only 2 Mb of memory to be stored and needs to be computed only once. Furthermore, given an image x to be recognized, the systems and methods herein can precompute its embedding $\phi(x)$ and multiply it with tensor T, leading to an utility tensor $U_x$ of size $|\Sigma| \times L \times L$ that represents the utility of transcribing the i-th character of the word as any of the symbols in $\Sigma$ assuming than the word is of length l:

$$U_x(i,j,l) = \phi(x)^T T(i,j,l) \qquad (7)$$

for all i between 1 and $|\Sigma|$, all j between 1 and l, and all l between 1 and L. In this case, the equation can be further rewritten as.

$$s(x,y) = \frac{\sum_{i=1}^{|y|} \phi(x)^T W^T h(y_i, i, |y|)}{\left\|\sum_{i=1}^{|y|} W^T h(y_i, i, |y|)\right\|} = \frac{\sum_{i=1}^{|y|} U_x(y_i, i, |y|)}{\left\|\sum_{i=1}^{|y|} T(y_i, i, |y|)\right\|} \qquad (8)$$

Recalling equation (3), the systems and methods provide a solution to the problem of finding the most likely transcription of image x into that of finding the most likely characters and length of the transcription, and combining it with the similarity of equation (8), the systems and methods obtain:

$$\hat{y} = \underset{l, c_1, \ldots, c_l}{\text{argmax}}\, s(x, \{c_1, \ldots, c_l\}) = \underset{l, c_1, \ldots, c_l}{\text{argmax}} \frac{\sum_{i=1}^{l} U_x(c_i, i, l)}{\left\|\sum_{i=1}^{l} T(c_i, i, l)\right\|} \qquad (9)$$

For simplicity, one may consider solving equation (3) independently for every value of l≤L, and then taking the solution with the largest similarity. Given a transcription length l, this problem can be seen as finding the best path in a directed acyclic graph (DAG), where each node of the graph represents a given character of the alphabet at a given position in the word, and every edge contains the utility and cost of choosing the selected node, see FIG. 1. This best path can be found recursively, by exhaustively evaluating the influence of every character at every position in a depth-first manner and accumulating the intermediate utilities and costs at each node for efficiency. This method explores all possible words up to a given length, and therefore obtains exactly the same solution that one would obtain explicitly producing the lexicon words, encoding them with $\psi$ and using equations (1) and (2), albeit in a more efficient manner.

One may also generalize this to produce not just the best but the N best solutions. This can be achieved with almost no extra cost by using a max-heap of capacity N, and pushing the current solution and its score whenever the score of the new solution is larger than the score of the worst solution currently held by the max-heap. Obtaining more than one solution may be useful to re-rank the best solutions with more powerful descriptions. For example, one may consider using text embeddings that also encode bigrams. Bigrams may help with errors due to swapping consecutive characters, but unfortunately cannot be integrated easily in the proposed framework since the additive property described in equation (4) would no longer hold. However, the results could easily be used in a re-ranking stage to further improve the results.

The algorithm described in the previous paragraphs allows the user to find the most likely transcription of a word of length *l* in an exact and efficient manner. However, given the exponential nature of the search space as the potential length of the words increases, applying this algorithm for values of *l* larger than 5 or 6 is difficult. The systems and methods described herein provide an approximate search that dramatically speeds-up the optimization process. A feature herein is that, when exploring the DAG of FIG. 1, the systems and methods herein may rapidly find that some nodes will not be used by the best path, and so they can be removed from the graph. Intuitively, this implies reducing the number of characters explored at each level. By applying a pruning strategy the systems and methods herein can drastically reduce the search space while preserving the accuracy. One obvious approach to reduce the search space is applying a branch and bound strategy. However, the non-linearity introduced in the denominator of the equation (9) makes it difficult to find a tight upper bound to effectively prune a node in the graph while guaranteeing that the optimal solution is not removed. The systems and methods herein provide a fast heuristic to reduce the search space.

The systems and methods herein observe that, given a word length, the values of $\|T(i,j,l)\|$ have a limited variance, and so that the utility $U_x$ carries most of the weight of the final score. Therefore, as a heuristic, at a given level, this disclosure chose to explore only the K most promising character nodes according to $U_x$, where K controls the trade-off between the search-space reduction and the accuracy of the heuristic. Large values of K will ensure that the solution found is still optimal, but the reduction of the search space will be limited. Small values of K may discard the optimal solution, but will significantly reduce the search space.

The previous formulation focuses on the lexicon-free recognition case. However, the approach can be extended to address cases where some information about the lexicon is known in advance. The systems and methods herein can focus on two scenarios. In the first one, the lexicon is fully known in advance and for known, moderately large lexicons, precomputing the φ embeddings of all the lexicon words and performing the ranking may be still possible, but impractical. The systems and methods herein can modify the proposed approach to deal with known lexicons. A feature herein is that, given a lexicon, the systems and methods herein can first encode the text words into a prefix tree or trie, and then, at recognition time, use this information to explore at each level only the characters that lead to a word in the lexicon. The advantage of this with respect to a direct approach, besides not needing to explicitly encode the lexicon, would be that the incremental utilities and costs for every prefix are memorized, and therefore they would not be implicitly recomputed for every lexicon word.

The second scenario is that the pattern of the word is known. In some cases, one has advanced knowledge of the type of words to recognize. For example, in the case of license plates, one may search for transcriptions that satisfy the following pattern: 3 numbers-3 letters-2 numbers. Again, this can be very easily addressed by expanding only the corresponding nodes. For this example, the systems and methods herein would only expand numbers for the first three levels, only letters for the following three, and again only numbers for the last two. This significantly reduces the search space, and therefore the time required to find the correct transcription.

The optimization problem of equation (9), given the length $l$, can be seen in FIG. 1 as finding the best path over a directed acyclic graph (DAG) from the start to the end node. Every black edge in the graph has a utility value and a cost vector associated with it, which represents the utility and cost of choosing a given character at a given level, and which depends on the word image and the text embedding. The gray edges are for synchronization purposes and have a zero utility and cost. The score of a complete path is measured as the sum of utilities divided by the norm of the sum of costs of the edges that the path uses. To naively obtain the best path, the systems and methods herein exhaustively searches all the possible combinations. For efficiency purposes, it is possible to accumulate at each node the current sum of utilities and costs. The best path is then found recursively by exploring the nodes in a depth-first manner; see the algorithm (1).

Figure 2:
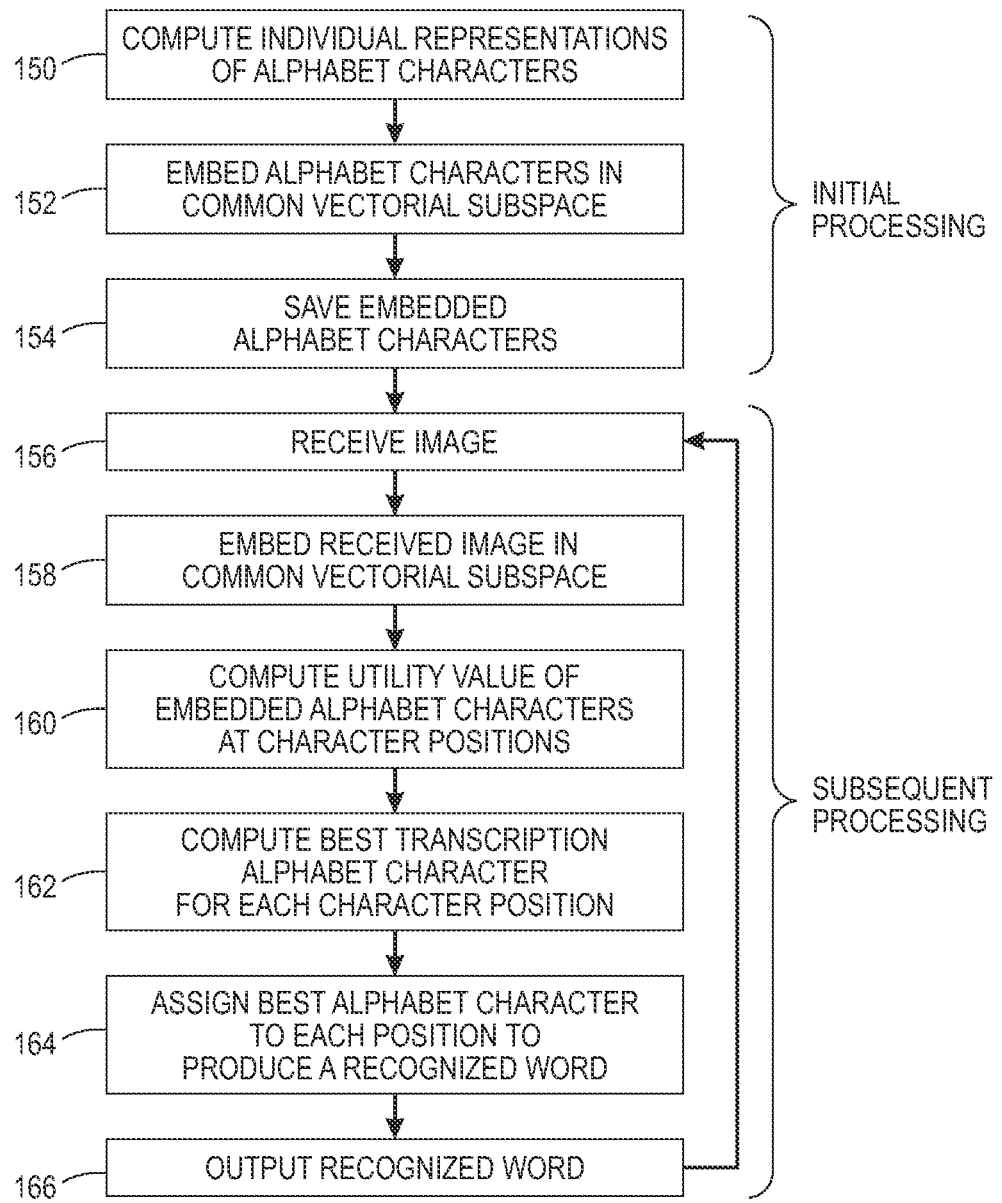
FIG. 2 is a flow diagram of various methods herein.

FIG. 2 is a flowchart illustrating exemplary methods herein that recognize alphanumeric characters in an image. Before recognizing alphanumeric characters, these methods perform initial processing (e.g., preprocessing) in items 150-154. Specifically, in item 150, these methods compute (or precompute) individual representations of every character of an alphabet (e.g., A-Z and 0-9, and potentially even punctuation and a null character, etc.) at every character position within a certain word transcription length. The null character represents a blank space or a character that is not within the alphabet. Then, in item 152, these methods embed the individual representations of each alphabet character in a common vectorial subspace (using a matrix) to produce "embedded alphabet characters." These methods then save the embedded alphabet characters in, for example, a tensor in item 154.

After performing the initial processing (which does not thereafter need to be repeated), these methods repeatedly perform subsequent processing (in item 156-164) on subsequently received images using the embedded alphabet characters stored in item 154. Specifically, in item 156, these methods receive (into the image processor mentioned above or another image processor) an electronic image obtained from an image sensor device (e.g., camera, scanner, optical sensor, etc.) that is in some way operatively (meaning directly or indirectly) connected to the image processor. In other words, a camera or scanner may obtain an electronic (e.g., digital) image of an alphanumeric word, and that image can be forwarded to an image processor (e.g., over a network or internally within a device).

Then, in item 158, these methods embed the received electronic image of the alphanumeric word into the same common vectorial subspace (using the same matrix) to produce an "embedded alphanumeric character image." This can be performed using the image processor that performed the initial processing, or any other image processor that has access to the stored embedded alphabet characters. For ease of terminology, it can be said that the embedded alphanumeric character image represents or encodes "image characters" at "character positions."

Such methods then use an image processor to compute the utility value of every one of the precomputed embedded alphabet characters at every one of the character positions with respect to the embedded alphanumeric character image (in item 160). In other words, the utility of the embedded representations of each alphanumeric character in the alphabet (A-Z and 0-9, and potentially even punctuation and a null character, etc.) is computed for every possible character position in the image. For example, the process of computing the utility value in item 160 can include processing the received image with a tensor to produce a utility tensor that represents the utility of transcribing each of the image characters to each of the embedded alphabet characters.

Next, in item 162, these methods compute the "highest-utility" transcription alphabet character (or punctuation or a null character) for each of the character positions based on the utility value of each embedded alphabet character at each character position (within the word transcription length). When computing the highest-utility transcription alphabet character in item 162, these methods find the highest-utility path over a directed acyclic graph (DAG). The DAG has nodes, where each of the nodes represents one of the embedded alphabet characters at one of the character positions, and each of the character positions includes a different node for each different embedded alphabet character. Every edge between the nodes contains the utility value and a cost value of choosing each of the nodes. Thus, in item 162, the methods herein find the highest-utility path over the DAG based on the utility value and the cost value of choosing each of the nodes. This can be performed using an exhaustive search approach, where all paths are explored, or using an approximate search approach where only the most promising paths are explored.

In other words, in item 162, the methods find the highest-utility path over the DAG by accumulating the utility values and the cost values of each the edges of different path in the DAG. The process of accumulating the utility value and the cost value in item 162 involves calculating the score of each path of the DAG by, for each said path: summing the utility values of all edges between nodes of a given path to produce summed utility values for that path; summing the costs of all the edges of that path to produce summed cost values for the path; calculating a normal cost value of the summed cost values; and dividing the summed utility values by the normal cost value.

Then, in item 164, such methods assign the highest-utility transcription alphabet character for each of the character positions to produce a recognized alphanumeric word within the received image and to determine the character length of the recognized alphanumeric word. In item 164 the alphabet character (or punctuation or a null character) having the highest utility score is determined to be the correctly recognized character for a given character position. Also, the null character having the highest utility score indicates a break in the chain of continuous characters, which determines the boundaries between different words of continuous characters, and corresponding determines the word length of each of the recognized alphanumeric words of continuous characters in item 164. The recognized alphanumeric word is output from the processor in item 166, and processing returns to receive the next image for character recognition in item 156.

The hardware described herein plays a significant part in permitting the foregoing method to be performed, rather than function solely as a mechanism for permitting a solution to be achieved more quickly, (i.e., through the utilization of a computer for performing calculations).

As would be understood by one ordinarily skilled in the art, the processes described herein cannot be performed by human alone (or one operating with a pen and a pad of paper) and instead such processes can only be performed by a machine (especially when the digital image data being processed, and the speed at which such data needs to be evaluated is considered). Specifically, processes such as receiving electronic image data, processing digital image data, etc., requires the utilization of different specialized machines, and humans would not be able to access such data because it is in the form of electronic information.

Further, such machine-only processes are not mere "post-solution activity" because the processing of the electronic data involves each step in the process. Also, data processing/transmission is integral with the process performed by the methods herein, and is not mere post-solution activity, because the digital image must travel through conductive wires or over wireless networks to be processed by the image processor. In other words, these various machines are integral with the methods herein because the methods cannot be performed without the machines (and cannot be performed by humans alone).

Additionally, the methods herein solve many highly complex technological problems. For example, as mentioned above, optical character recognition processes are tied to a lexicon. Methods herein solve this technological problem by avoiding the need to provide a lexicon, and instead each character position is evaluated against an entire alphabet, without a pre-known word length, which avoids the need for a lexicon. This simplifies the processing and thereby reduces the amount of electronic storage that an image processor must maintain and frees up processing resources to make the image processor accomplish more tasks in the same amount of time (improving the processing speed of the image processor). By granting such benefits, the methods herein reduce the amount and complexity of hardware needed, thereby solving a substantial technological problem that providers experience today.

Figure 3:
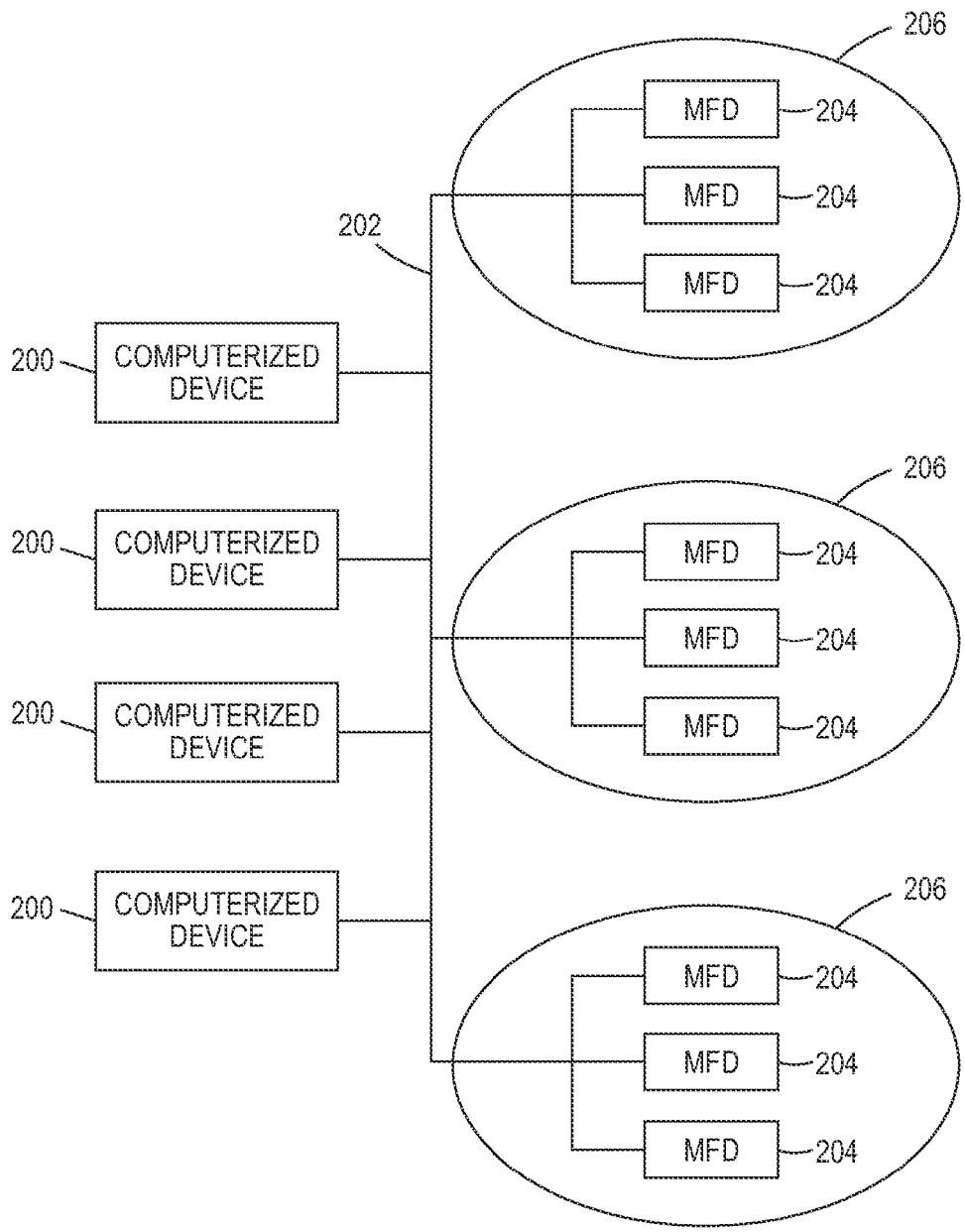
FIG. 3 is a schematic diagram illustrating systems herein.

As shown in FIG. 3, exemplary systems and methods herein include various computerized devices 200, 204 located at various different physical locations 206. The computerized devices 200, 204 can include servers, optical devices, personal computers, etc., and are in communication (operatively connected to one another) by way of a local or wide area (wired or wireless) network 202.

Figure 4:
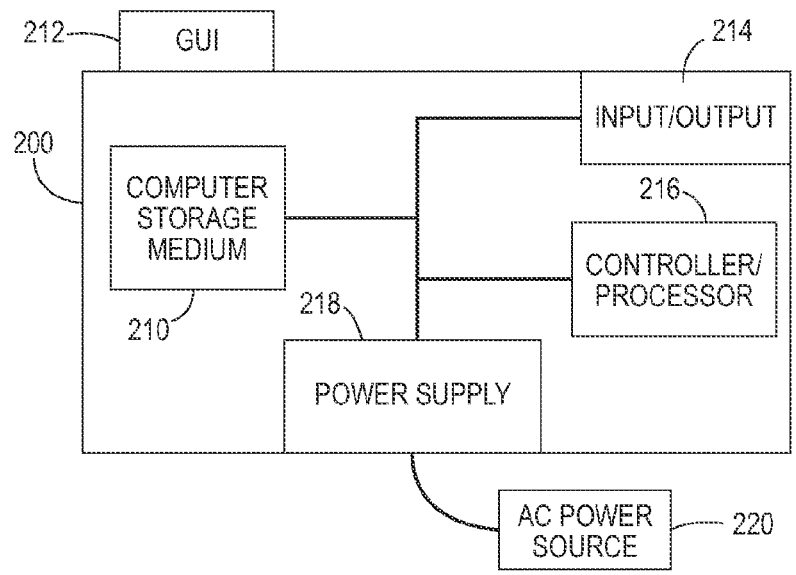
FIG. 4 is a schematic diagram illustrating devices herein.

FIG. 4 illustrates a computerized device 200, which can be used with systems and methods herein and can comprise, for example, a server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 4, a body housing has one or more functional components that operate on power supplied from an alternating current (AC) source 220 by the power supply 218. The power supply 218 can comprise a common power conversion unit, power storage element (e.g., a battery, etc), etc.

Figure 5:
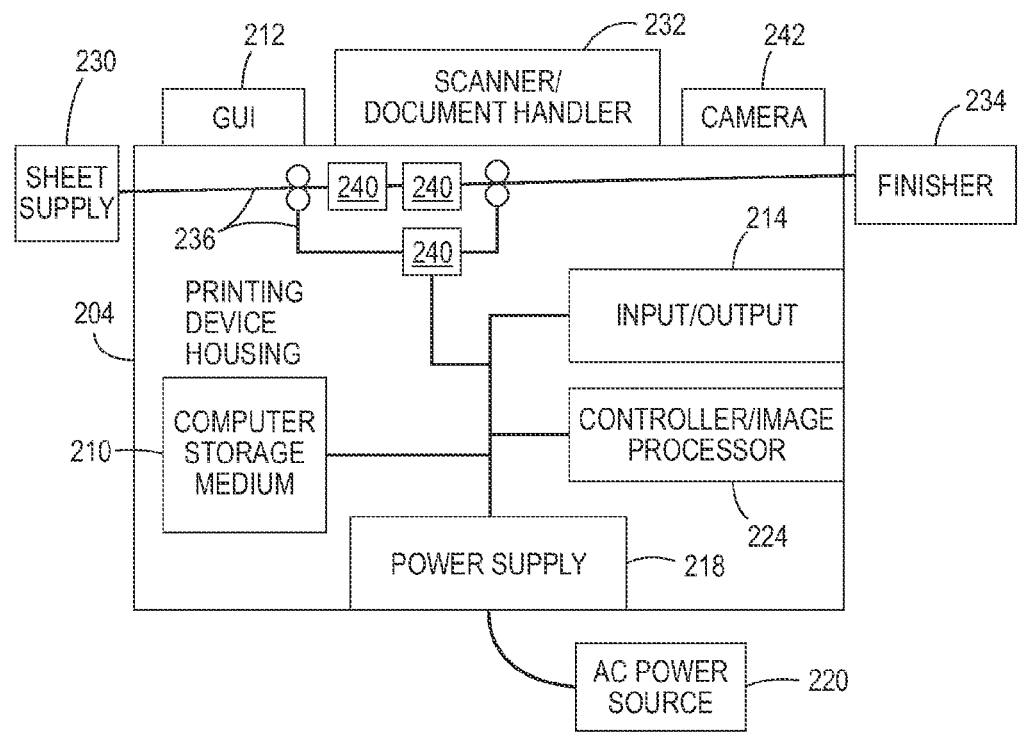
FIG. 5 is a schematic diagram illustrating devices herein.

FIG. 5 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Item 242 illustrates another image capture device (e.g., a camera) that can be any device capable of obtaining pixel values of an item. The set of image input devices discussed herein is intended to encompass a wide variety of devices such as, for example, digital document devices, computer systems, memory and storage devices, networked platforms such as servers and client devices which can obtain pixel values from a source device, and image capture devices. The set of image capture devices herein includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Thus, as shown above, systems herein similarly include (among other components) an image sensor device 232/242, and an image processor device 216/224 operatively connected to the image sensor device 232/242. The image processor device 216/224 automatically performs initial processing by computing individual representations of all alphabet characters of an alphabet at every character position within a word transcription length, embedding the individual representations of the alphabet characters in a common vectorial subspace using a matrix to produce embedded alphabet characters, and saving the embedded alphabet characters.

After the initial processing, the image processor device 216/224 repeatedly automatically performs subsequent processing without repeating the initial processing. This subsequent processing includes receiving an electronic image of an alphanumeric word from the image sensor device 232/242 and embedding the electronic image into the common vectorial subspace using the matrix to produce an embedded alphanumeric character image. The embedded alphanumeric character image represents or encodes image characters at character positions.

This subsequent processing includes computing a utility value of every one of the embedded alphabet characters at each of the character positions with respect to the embedded alphanumeric character image using the image processor device 216/224, and computing the highest-utility transcription alphabet character for every one of the character positions based on the utility value of each the embedded alphabet character at each of the character positions, within the word transcription length. During the subsequent processing, the image processor device 216/224 assigns the highest-utility transcription alphabet character for each of the character positions to produce a recognized alphanumeric word within the electronic image, and determines a character length of the recognized alphanumeric word. The image processor device 216/224 outputs the recognized alphanumeric word.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, book-making machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes. Also, the term 'embed' is understood to mean, an instance of some mathematical structure contained within another instance, such as a group that is a subgroup. Further, the terms automated or automatically mean that once a process is started (by a machine or a user); one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method of recognizing alphanumeric characters in an image comprising:
   computing representations of all alphabet characters of an alphabet at every character position within a word transcription length;
   embedding said representations of said alphabet characters in a common vectorial subspace using a matrix to produce embedded alphabet characters;
   embedding a received image of an alphanumeric word into said common vectorial subspace using said matrix to produce an embedded alphanumeric character image, said embedded alphanumeric character image representing image characters at character positions;
   computing a utility value in a directed acyclic graph (DAG) of every one of said embedded alphabet characters at each of said character positions of said embedded alphanumeric character image;
   computing a highest-utility transcription alphabet character by finding a highest-utility path in said DAG for every one of said character positions based on said utility value of each said embedded alphabet character at each of said character positions, within said word transcription length; and
   assigning said highest-utility transcription alphabet character for each of said character positions to produce a recognized alphanumeric word within said received image.

2. The method according to claim 1, said DAG having nodes,
   each of said nodes represents one of said embedded alphabet characters at one of said character positions,
   each of said character positions includes a different node for each different one of said embedded alphabet characters,
   every edge between said nodes contains said utility value and a cost value of choosing each of said nodes, and
   said finding said highest-utility path over said DAG begin based on said utility value and said cost value of choosing each of said nodes.

3. The method according to claim 2, said finding said highest-utility path over said DAG begin based on accumulating said utility value and said cost value of each different path in said DAG.

4. The method according to claim 3, said accumulating said utility value and said cost value comprising calculating a score of each path of said DAG by, for each said path:
   summing utility values of all edges between nodes of a path to produce summed utility values for said path;
   summing costs of all said edges of said path to produce summed cost values for said path;
   calculating a normal cost value of said summed cost values; and
   dividing said summed utility values by said normal cost value.

5. The method according to claim 2, said finding said highest-utility path comprising one of:
   using an exhaustive search approach, where all paths are explored; and
   using an approximate search approach, where only most promising paths are explored.

6. The method according to claim 1, said computing said utility value comprising processing said received image of said embedded alphanumeric character image with a tensor to produce a utility tensor that represents a utility of transcribing each of said image characters to each of said embedded alphabet characters.

7. The method according to claim 1, further comprising storing said embedded alphabet characters in a tensor.

8. A method of recognizing alphanumeric characters in an image comprising:
   automatically performing initial processing using an image processor comprising:
      computing representations of all alphabet characters of an alphabet at every character position within a word transcription length;
      embedding said representations of said alphabet characters in a common vectorial subspace using a matrix to produce embedded alphabet characters; and
      saving said embedded alphabet characters; and
   after said initial processing repeatedly automatically performing subsequent processing without repeating said initial processing, said subsequent processing comprising:
      receiving, into said image processor, an electronic image of an alphanumeric word from an image sensor device operatively connected to said image processor;
      embedding said electronic image into said common vectorial subspace using said matrix to produce an embedded alphanumeric character image using said image processor, said embedded alphanumeric character image representing image characters at character positions;
      computing a utility value in a directed acyclic graph (DAG) of every one of said embedded alphabet characters at each of said character positions of said embedded alphanumeric character image using said image processor;
      computing a highest-utility transcription alphabet character by finding a highest-utility path in said DAG for every one of said character positions based on said utility value of each said embedded alphabet character at each of said character positions, within said word transcription length, using said image processor;
      assigning said highest-utility transcription alphabet character for each of said character positions to produce a recognized alphanumeric word within said electronic image and determine a character length of said recognized alphanumeric word using said image processor; and
      outputting said recognized alphanumeric word from said image processor.

9. The method according to claim 8, said DAG having nodes,
   each of said nodes represents one of said embedded alphabet characters at one of said character positions,
   each of said character positions includes a different node for each different one of said embedded alphabet characters,
   every edge between said nodes contains said utility value and a cost value of choosing each of said nodes, and
   said finding said highest-utility path over said DAG begin based on said utility value and said cost value of choosing each of said nodes.

10. The method according to claim 9, said finding said highest-utility path over said DAG begin based on accumulating said utility value and said cost value of each different path in said DAG.

11. The method according to claim 10, said accumulating said utility value and said cost value comprising calculating a score of each path of said DAG by, for each said path:

summing utility values of all edges between nodes of a path to produce summed utility values for said path;

summing costs of all said edges of said path to produce summed cost values for said path;

calculating a normal cost value of said summed cost values; and dividing said summed utility values by said normal cost value.

12. The method according to claim 9, said finding said highest-utility path comprising one of:

using an exhaustive search approach, where all paths are explored; and using an approximate search approach, where only most promising paths are explored.

13. The method according to claim 8, said computing said utility value comprising processing said electronic image of said embedded alphanumeric character image with a tensor to produce a utility tensor that represents a utility of transcribing each of said image characters to each of said embedded alphabet characters.

14. The method according to claim 8, further comprising storing said embedded alphabet characters in a tensor.

15. A system comprising:

an image sensor device;

an image processor device operatively connected to said image sensor device, said image processor device automatically performing initial processing comprising:

computing representations of all alphabet characters of an alphabet at every character position within a word transcription length;

embedding said representations of said alphabet characters in a common vectorial subspace using a matrix to produce embedded alphabet characters; and saving said embedded alphabet characters, after said initial processing, said image processor device repeatedly automatically performing subsequent processing without repeating said initial processing, said subsequent processing comprising:

receiving an electronic image of an alphanumeric word from said image sensor device;

embedding said electronic image into said common vectorial subspace using said matrix to produce an embedded alphanumeric character image, said embedded alphanumeric character image representing image characters at character positions;

computing a utility value in a directed acyclic graph (DAG) of every one of said embedded alphabet characters at each of said character positions of said embedded alphanumeric character image;

computing a highest-utility transcription alphabet character by finding a highest-utility path in said DAG for every one of said character positions based on said utility value of each said embedded alphabet character at each of said character positions, within said word transcription length; and assigning said highest-utility transcription alphabet character for each of said character positions to produce a recognized alphanumeric word within said electronic image and determine a character length of said recognized alphanumeric word, and said image processor device automatically outputting said recognized alphanumeric word.

16. The system according to claim 15, said DAG having nodes, each of said nodes represents one of said embedded alphabet characters at one of said character positions, each of said character positions includes a different node for each different one of said embedded alphabet characters, every edge between said nodes contains said utility value and a cost value of choosing each of said nodes, and said finding said highest-utility path over said DAG begin based on said utility value and said cost value of choosing each of said nodes.

17. The system according to claim 16, said finding said highest-utility path over said DAG begin based on accumulating said utility value and said cost value of each different path in said DAG.

18. The system according to claim 17, said accumulating said utility value and said cost value comprising calculating a score of each path of said DAG by, for each said path:

summing utility values of all edges between nodes of a path to produce summed utility values for said path;

summing costs of all said edges of said path to produce summed cost values for said path;

calculating a normal cost value of said summed cost values; and dividing said summed utility values by said normal cost value.

19. The system according to claim 16, said finding said highest-utility path comprising one of:

using an exhaustive search approach, where all paths are explored; and using an approximate search approach, where only most promising paths are explored.

20. The system according to claim 15, said computing said utility value comprising processing said electronic image of said embedded alphanumeric character image with a tensor to produce a utility tensor that represents a utility of transcribing each of said image characters to each of said embedded alphabet characters.

* * * * *